United States Patent
Dimitrova et al.

(10) Patent No.: US 6,714,594 B2
(45) Date of Patent: Mar. 30, 2004

(54) VIDEO CONTENT DETECTION METHOD AND SYSTEM LEVERAGING DATA-COMPRESSION CONSTRUCTS

(75) Inventors: Nevenka Dimitrova, Yorktown Heights, NY (US); Thomas McGee, Garrison, NY (US); Gerhardus Engbertus Mekenkamp, Valkenswaard (NL); Edwin Salomons, Dublin (IE)

(73) Assignee: Koninklijke Philips Electronics N.V., Eindhoven (NL)

( * ) Notice: Subject to any disclaimer, the term of this patent is extended or adjusted under 35 U.S.C. 154(b) by 279 days.

(21) Appl. No.: 09/854,511

(22) Filed: May 14, 2001

(65) Prior Publication Data

US 2002/0186768 A1 Dec. 12, 2002

(51) Int. Cl.[7] .................................................. H04N 7/12
(52) U.S. Cl. ............................. 375/240.16; 375/240.12
(58) Field of Search .................... 382/156, 224, 382/228; 386/94, 96; 375/240.12, 240.16; 348/700

(56) References Cited

U.S. PATENT DOCUMENTS

| | | | | |
|---|---|---|---|---|
| 4,750,052 A | * | 6/1988 | Poppy et al. | 386/63 |
| 4,750,213 A | * | 6/1988 | Novak | 455/3.01 |
| 4,752,834 A | * | 6/1988 | Koombes | 386/59 |
| 5,151,788 A | * | 9/1992 | Blum | 348/725 |
| 5,333,091 A | * | 7/1994 | Iggulden et al. | 386/55 |
| 5,696,866 A | * | 12/1997 | Iggulden et al. | 386/46 |
| 5,767,922 A | * | 6/1998 | Zabih et al. | 348/700 |
| 5,911,029 A | * | 6/1999 | Sakaguchi et al. | 386/46 |
| 6,002,831 A | * | 12/1999 | Tada et al. | 386/46 |
| 6,014,183 A | * | 1/2000 | Hoang | 348/702 |
| 6,021,220 A | * | 2/2000 | Anderholm | 382/194 |
| 6,157,744 A | * | 12/2000 | Nagasaka et al. | 382/236 |
| 6,404,977 B1 | * | 6/2002 | Iggulden | 386/46 |
| 6,469,749 B1 | * | 10/2002 | Dimitrova et al. | 348/722 |

FOREIGN PATENT DOCUMENTS

| WO | WO0150339 | 12/2001 | ........... G06F/17/30 |
|---|---|---|---|

OTHER PUBLICATIONS

Lienhart et al: "On the detection and recognition of television commercials," Multimedia computing And Systems '97. Proceedings., IEEE International Conference On Ottawa, Ont., Canada, Jun. 3–6, 1997, pp. 509–516.

Hauptmann et al: "Story segmentation and detection of commercials in broadcast news video," Research And Technology Advances In Digital Libraries, 1998. ADL 98. Proceedings. IEEE International Conference Forum On Santa Barbara, CA, USA, Apr. 22–24, 1998, pp. 168–179.

* cited by examiner

Primary Examiner—Chris Kelley
Assistant Examiner—George A Bugg

(57) ABSTRACT

The process of compressing video requires the calculation of a variety data that are used in the process of compression. The invention exploits some or all of these data for purposes of content detection. For example, these data may be leveraged for purposes of commercial detection. The luminance, motion vector field, residual values, quantizer, bit rate, etc. may all be used either directly or in combination, as signatures of content. A process for content detection may employ one or more features as indicators of the start and/or end of a sequence containing a particular type of content and other features as verifiers of the type of content bounded by these start/end indicators. The features may be combined and/or refined to produce higher-level feature data with good computational economy and content-classification utility.

19 Claims, 2 Drawing Sheets

VIDEO CONTENT DETECTION METHOD AND SYSTEM LEVERAGING DATA-COMPRESSION CONSTRUCTS

CROSS-REFERENCE TO RELATED APPLICATIONS

The present application is related to the following patents/applications, which are hereby incorporated by reference as if fully set forth in their entireties herein.

1. "Apparatus and Method for Locating a Commercial Disposed Within a Video Data Stream," invented by: Nevenka Dimitrova, Thomas McGee, Herman Elenbaas, Eugene Leyvi, Carolyn Ramsey and David Berkowitz, Filed Jul. 28, 1998, U.S. Pat. No. 6,100,941.

2. "Automatic Signature-Based Spotting, Learning and Extracting of Commercials and Other Video Content," invented by Dimitrova, McGee, Agnihotri, filed Oct. 13, 1999, U.S. Pat. No. 6,469,749

BACKGROUND OF THE INVENTION

1. Field of the Invention

The invention relates to the detection of content in video data streams, for example, commercials and more particularly to the accurate identification of transitions from one type of content to another, such as the temporal boundaries of commercial.

2. Background of the Invention

Personal video receivers/recorders, devices that modify and/or record the content of broadcast video, are becoming increasingly popular. One example is a personal video recorder, which automatically records programs on a hard disk responsively to stored user preferences. One of the features under investigation for such systems is content detection. For example, a system that can detect commercials may allow substitute advertisements to be inserted in a video stream ("commercial swapping") or temporary halting of the video at the end of a commercial to prevent a user, momentarily distracted during a commercial, from missing any of the main program content.

There are known methods for detecting commercials. One method is the detection of high cut rate due to a sudden change in the scene with no fade or movement transition between temporally-adjacent frames. Cuts can include fades so the cuts do not have to be hard cuts. A more robust criterion may be high transition rates. Another indicator is the presence of a black frame (or monochrome frame) coupled with silence, which may indicate the beginning of a commercial break. Another known indicator of commercials is high activity, an indicator derived from the observation/assumption that objects move faster and change more frequently during commercials than during the feature (non-commercial) material. These methods show somewhat promising results, but reliability is still wanting. There have been many issued patents devoted to commercial isolation that employ detection of monochrome frames and high activity. The use of monochrome frames, scene breaks, and action, as measured by a technique called "edge change ratio and motion vector length," has been reported.

The combination of black frame detection and "activity" as represented by a rate of change of luminance level, has been discussed. Unfortunately, it is difficult to determine what constitutes "activity" and identifying the precise point of onset and termination. Black frames produce false positives because, among other things, they are also found in dissolves. Thus, any sequence of black frames followed by a high action sequence can be misjudged and skipped as a commercial.

Another technique is to measure the temporal distance between black frame sequences to determine a presence of a commercial. Another technique identified commercials based on matching images. In other words, differences in the qualities of the image content were used as an indicator. Also known is the use of a predetermined indicator within the video stream which demarcates commercial boundaries, but this is simply a method of indicating a previously known commercial, not a method of detecting them. Commercial detection based on trained neural networks configured to distinguish content based on analysis of the video stream have been proposed, but have not met with much success so far. Also, neural networks are complex and expensive to implement for this purpose.

SUMMARY OF THE INVENTION

Briefly, the invention employs low and mid-level features that are automatically generated in the process of compressing video as inputs to various classifier tools. The classifier tools are trained to identify commercial features and generate metrics responsively to them. The metrics are employed in combination (a super-classifier) to detect the boundaries of the commercials. The benefit of using these low- and mid-level features is that they can be generated and processed very quickly using relatively inexpensive electronics, such as using an application-specific integrated circuit (ASIC) or application-specific instruction-set processor (ASIP).

Generally speaking, a dedicated chip normally performs image compression on consumer appliances, since the processes involved require high speed. One aspect of the invention is to provide a way to leverage the results of the compression process, not only for compression, but also for the analysis of the video required to detect certain types of content. One example of a device that can compress video implements the Motion Pictures Expert Group (MPEG) compression scheme known as MPEG-2.

In MPEG-2, video data are represented by video sequences, each including of a group of pictures (GOP), each GOP including pieces of data that describe the pictures or "frames" that make up the video. The frame is the primary coding unit of the video sequence. A picture consists of three rectangular matrices, one representing luminance (the intensity of the various portions of a frame) and two representing chrominance (Cb and Cr; the color of the various portions of a frame). The luminance matrix has an even number of rows and columns. The chrominance matrices are one-half the size of the Y matrix in each direction (horizontal and vertical) because human perception is less detail-sensitive for color than it is for luminosity. Each frame is further divided into one or more contiguous macroblocks, grouped into "slices." The order of the macroblocks within a slice is from left-to-right and top-to-bottom. The macroblock is the basic coding unit in the MPEG-2 scheme. It represents a 16×16 pixel part of a frame. Since each chrominance component has one-half the vertical and horizontal resolution of the luminance component, a macroblock consists of four luminance, one Cb block and one Cr block. Each luminance macroblock is further divided into four blocks of 8×8 pixels.

In MPEG-2, some frames, called Intra-frames or "I-frames," are represented by data that is independent of the content of any other frame. This allows a playback device to enter the video file at any point where such a frame is located. In MPEG-2, frames are grouped into a group of pictures (GOP), with an I-frame always leading any group of pictures. I-frames are distinct from Predicted frames or "P-frames" which are defined partly by data representing the frame corresponding to the P-frame and partly on data representing one or more previous frames. Bidirectional frames or "B-frames" are represented by data from both prior and future frames as well as the data corresponding to the B-frame itself.

The way in which data is compressed in MPEG-2 depends on the type of frame. The blocks of an I-frame are each translated into a different format called discrete cosine transform (DCT). This process can be roughly described as defining the appearance of each block as a sum of different predefined wave patterns so a highly detailed pattern would include a lot of short wave patterns and a smooth pattern would include long (or no) waves. The reason for doing this is that in video, many of the blocks are smooth. This allows the data that describes the contributions of short waves in such blocks to be greatly compressed by a process called run-length encoding. Also, when the video must be forced into a bottleneck and certain data have to be sacrificed, throwing out certain data from the DCT representation yields a better looking picture than throwing out data in the original image, which could, for example, leave the pictures full of holes.

The DCT data can be represented as many different wavy patterns, or only a few, with big steps between them. Initially, the DCT data are very fine-grained. But as part of the compression process, the DCT data are subjected to a process called quantization where the relative contributions of the different wave patterns are represented by coarse or fine-grained scales, depending on how much the data has to be compressed.

Compressing video images to generate P-frames and B-frames involve more complex processes. A computer takes a first image and its predecessor image and looks for where each block (or macroblock, depending on the selection of the user) moved from one image to the next. Instead of describing the whole block in the P-frame, the MPEG-2 data simply indicates where the block in the earlier frame moved to in the new frame. This is described as a vector, a line, or arrow, whose length indicates distance of the movement and whose orientation indicates the direction of the movement. This kind of description is faulty, however, because not all motion in video can be described in terms of blobs moving around. The defect, however, is fixed by transmitting a correction that defines the difference between the image as predicted by a motion description and the image as it actually looked. This correction is called the residual. The motion data and residual data are subjected to the DCT and quantization, just as the I-frame image data. B-frames are similar to P-frames, except that they can refer to both previous and future frames in encoding their data.

The example video compression device generates the following data for each frame, as a byproduct of the compression process. The following are examples of what may be economically derived from an encoder and are by no means comprehensive. In addition, they would vary depending on the type of encoder.

frame indicator: a frame identifier that can be used to indicate the type of frame (I, P, or B).

luminance DC total value: an indication of the luminance of an I-frame.

quantizer scale: the quantization scale used for the DCT data.

MAD (Mean Absolute Difference): the average of the magnitudes of the vectors used to describe a P- or B-image in terms of movement of blocks. There are several that may be generated: for example one representing only an upper or lower portion of a whole frame or one that includes all blocks of the frame.

Current bit rate: The amount of data representing a GOP

Progressive/Interlaced value: An indicator of whether the image is an interlaced type, usually found in conventional television video, or progressive type, usually found in video from movies and computer animation.

Luminance DC differential value: This value represents the variation in luminance among the macroblocks of a frame. Low variation means a homogeneous image, which could be a blank screen.

Chrominance DC total value. Analogous to luminance value but based on chrominance component rather than the luminance component.

Chrominance DC differential value. Analogous to luminance differential value but based on chrominance component rather than luminance component.

Letterbox value: indicates the shape of the video images by looking for homogeneous bands at the top and bottom of the frames, as when a wide-screen format is painted on a television screen.

Time stamps: These are not indicia of commercials, but indicate a location in a video stream and are used to mark the beginnings and ends of video sequences distinguishable by content.

Scene change detection: This indicates a sudden change in scene content due to abrupt change in average MAD value.

Keyframe distance: This is the number of frames between scene cuts.

As an example of a type of content that may be identified and temporally bracketed, over 15 hours of video with commercials were tested. The effectiveness of the different features, and combinations of features, as indicators of the beginnings and ends of commercial sequences were determined. It was determined that the individual indicators discussed above are less reliable on their own than when combined. These tests confirmed that various ways of combining these data may be used to produce reliable content detection, particularly commercial detection.

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause-of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE PREFERRED EMBODIMENTS

Figure 1:
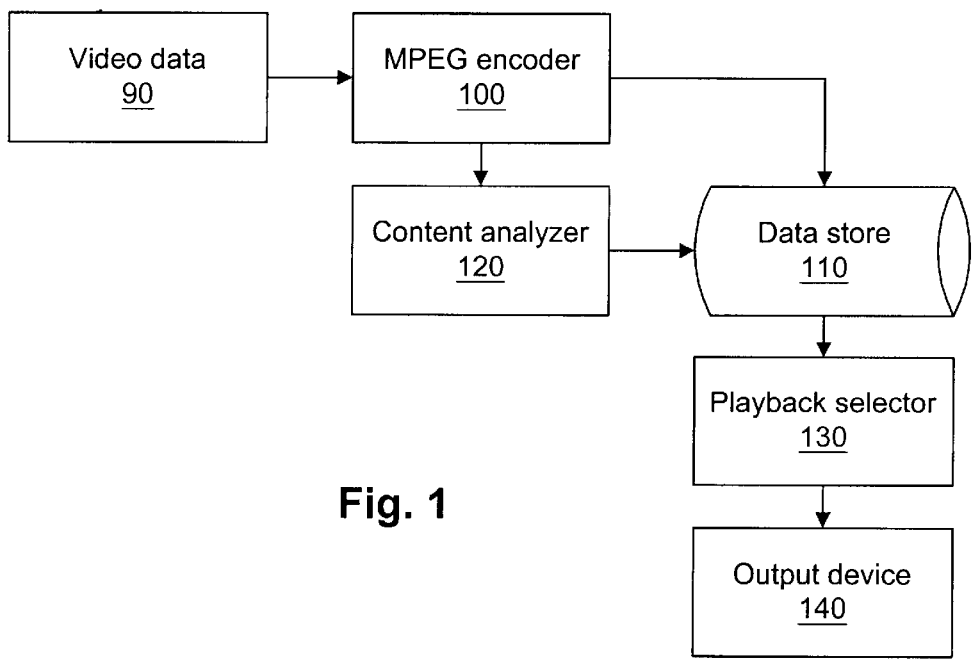
FIG. 1 is block diagram of a hardware system for implementing a process of video-content identification based on compression features according to an embodiment of the invention.

Referring to FIG. 1, a system is shown that may be used for detecting content by leveraging data produced during video compression. In the illustrated embodiment, an MPEG encoder 100 encodes video data 90 from a live data feed such as the Internet, a data store, a broadcast, or any other source. The MPEG encoder generates compressed data that may be stored in a data store 110 such as a hard disk, a DVD, CDROM, or other data storage medium. Alternatively, the data may be buffered for distribution by any suitable means. The MPEG encoder 100 may generate a variety of different values, some of them listed below.

- frame indicator
- luminance DC total value
- quantizer scale
- MAD (Mean Absolute Difference) total value, lower part
- Current bit rate
- Field move average in X-direction
- Luminance differential value
- MAD total value, upper part: sum of all MAD values
- MAD total value, lower part: sum of all MAD values
- Letterbox value
- Time stamp
- Chrominance DC total value
- Chrominance differential value Generally chip-based compression encoders do not generate all of these values and do not expose the registers that hold those values that they do generate because normally they have no other use. In the present invention, these values are applied to additional processes for content recognition. The compression chips may need to be modified to generate some of these values and expose their registers that hold them to outside processes. The computational burden on such a chip would not increased significantly by doing this and the required design modifications of the compression chip are well within the competence of a person of ordinary skill to perform. Pure software systems can provide these data to any other process by simple software modifications, such as variable definition changes. The above may be output to a content analyzer 120 in raw form by the MPEG encoder 100 or the data may be refined first, depending on the allocation (between the encoder 100 and the analyzer 120) of the functions described herein. These data are standard in the MPEG field, but are described for convenience below, along with some comment regarding how they may be utilized or filtered.

A playback selector 130 may use the results from the content analyzer to edit the compressed video. For example, where commercials or high action sequences are desired to be deleted from the video material, the playback selector can skip over material bracketed by markers resulting from the content analyzer 120 analysis and stored with the MPEG file in the data store 110. The MPEG data are described below as an example of the kinds of data that may be available from a compression process.

Frame Indicator

The frame indicator is just an ordinal identifier of the frame. The frame indicator distinguishes between I-frames and P-frames (and B-frames). For a GOP size of 6, I-frames have a value of 0 and P-frames (or B-frames) a value of 1,2,3,4 or 5. The I and P or B frame indication may be used for content detection as discussed below.

Luminance Total Value

The luminance total value is the sum of the first (out of 4) luminance DC values of each macro block over the entire frame. Any selection of the DC (chrominance or luminance) values may also be used. The former value is useful for I-frames only. For P-frames and B-frames, the luminance total value is calculated based on the previous frames. The luminance total value may be used for black frame detection. Alternatively, as discussed below, an aggregate value, the luminance differential value, may provide unicolor (non-black, but homogeneous color frames) and other advantages for this task. The luminance total value is advantageous for certain kinds of detection, such as for detection of flashes.

Quantizer Scale

The quantizer scale indicates the quantization value used by the MPEG encoder 100 for quantization of the video data. This quantization value may be adaptive to ensure that the bit rate stays in a predefined band. This feature is useful for detecting very complex or fast moving scenes. The value is relevant for I-frames as well as P-frames and B-frames.

MAD Total Value-Upper Part

As discussed above, part of the MPEG encoding process is the estimation of the motion of fields of color and luminance from one frame to another. The results of this process are displacement vectors whose values are determined by the MAD matching criterion. The MAD total value of the upper part can indicate sharp scene changes. The frame is split into an upper (slices 0–25) and a lower part (slices 26–35). In the upper part of the frame no subtitles appear and therefore no false detection due to text changes can occur. The MAD total value-upper part is the sum of all MAD values of the macro blocks of the slices 0–25. In the case of static scenes the macroblocks will be just slightly (if at all) displaced and will match quite well with the reference macro blocks. Therefore the MAD value will be very low (approaching zero). At a sharp scene change nearly no matching macroblocks will be found or just with a high content difference. Therefore the MAD value at a sharp scene change is much higher than the average MAD value.

MAD Total Value, Lower Part

The calculation of the value is the same as the one for the upper part of the frame. The MAD total value lower part is the sum of all MAD values of the macro blocks of the slices 26–35. Again, the frames are split because each change in subtitles (very often used in some countries in Europe) leads to a false scene change detection. The MAD value of the lower frame part can be useful as a subtitle change detector and as a support feature for the sharp scene change detector.

Current Bit Rate

The current bit rate indicates the bit rate for the transmission of the MPEG data and has a fixed value per GOP. To hold the current bit rate in a certain band the quantizer value is increased or decreased depending on the actual current bit rate. This value is used in combination with the quantizer value to indicate fast varying or very complex scenes.

Progressive/Interlaced Value

A field move average value in the X-direction indicates the displacement value of each macro block in the x-direction. This may be used, for example, as a check for sufficient movement in the scene, which in turn may be used to indicate whether there has been a shift from progressive to interlace video or the reverse. If the absolute value of the horizontal displacement of the actual macroblock is larger than 8 half pixels (control for sufficient movement either to the left or to the right), the progressive/interlaced value for the actual frame may be increased by one if the macroblock is frame DCT encoded (i.e., DCT type mode of the macroblock is 0) or decreased by one if the macroblock is field DCT coded (i.e., DCT type mode is 1). The progressive/interlaced value relative to a threshold may then be used as an indicator of whether the current video is progressive or interlaced.

Luminance DC Differential Value

This value may be used to indicate black frames, unicolor frames, and frames with low information content. To calculate the luminance DC differential value, the absolute difference of the DC values (only first DC value of each macroblock) of consecutive macroblocks in a slice are first summed together. The summed values of all the slices in the frame are then summed together to provide a total value.

Chrominance DC Differential Value

This value may be used to help indicate black frames, unicolor frames, and frames with low information content or the opposite. To calculate the chrominance DC differential value, the absolute difference of the DC values (or a subset) of consecutive macroblocks in a slice are first summed together as above. Separate values could be calculated for the separate chrominance signals, e.g., Cr and Cb.

A color histogram could also be an output of the compression encoder or made to be one. The histogram could be used to indicate unicolor frames. The histogram could also serve an independent signature device. That is, along with other parameters, or even by itself, it may serve to distinguish some types of content from others. The histogram can be efficiently generated because the blocks are at a lower resolution than the original image.

Letterbox Value

The letterbox value is based on the luminance DC value. The luminance DC total values of the macroblocks of the first two slices (slices 0 & 1) and the last two slices (slices 34 & 35 for PAL) are summed together and the maximum value of both values gives the Letterbox value. The letterbox value may be computed based on luminance differential value or total value.

Audio Features

As discussed below, audio compression produces a variety of useful values that may be used for classification of content. For example, a function that operates on the quantized subband data could be used to generate these additional features.

Time Stamps

The time stamps are used to retrieve frames, and to mark the content breaks detected.

The set of features discussed above may be reduced to generate a set of mid-level features derived therefrom. For example, the following were tested for their ability to aid in the detection of commercial breaks.

Scene change detection

Black frame/Unicolor frame detection

Letterbox detection

Interlaced/progressive Indicator

Keyframe distance

These features are described below.

Scene Change Detection

An indicator of scene change may be derived from the MAD total value of the upper part of the frame. In the event of a sharp scene change, this value jumps, for one or two frames, to a very high value and then returns again to a low value. A sliding time window may be used to calculate the average MAD value around the actual frame and its successor. If the MAD value for the actual frame (or the sum of the actual value and its successor) exceeds a certain threshold in relation to average MAD value, a sharp scene change may be indicated by changing the value of a scene change detector.

Black Frame/Unicolor Frame Detector

If the luminance DC differential value remains under a certain threshold, multiple thresholds may be used, a black frame or an unicolor frame is detected. Some broadcasters use unicolor frames (e.g. blue frames) instead of black frames between commercials. In this case, a unicolor frame indicator is useful for the commercial detector.

Interlaced/Progressive Indicator

The interlaced/progressive value may be used to differentiate between interlaced and progressive video material. A running sum may be generated by adding the interlaced/progressive value of each frame to the running sum. If this sum exceeds a threshold, for example, 20,000, the video material may be indicated as interlaced material or if below that threshold, it may be indicated as progressive material. A deadband may be defined between the two thresholds where the video material is not defined. This indicator may be useful for detecting commercials since commercials are produced with different equipment due to different budgets. Therefore the video material in the commercial block can change quite often between interlaced and progressive video material.

Letterbox Detector

The letterbox detector can be used to distinguish between material with a distinct aspect ratio (e.g., of 4:3 and 16:9). Some video, for example commercials, are sent out in formats that are different from the main program material. The main material could be in a letterbox (like a movie) or the commercial could be in a letterbox, the important data being the change itself. The letterbox indicates if the two upper and two lower slices are black. Advertisement banners, or small objects on a black background, result in a false detection, but these specific sequences are most probably not encapsulated by black (unicolor) frames and therefore they have only a minor influence on the commercial detector. A short letterbox sequence encapsulated by black (unicolor) frames is a good indication for a commercial block.

Keyframe Distance Detector

The keyframe distance detector is a measure of the time (or number of frames or GOPs) between scene breaks. The average keyframe frame distance detector can be used to indicate slowly changing video material vs. rapidly changing video material. During the commercial breaks the keyframe distance is low typically varying around 10–15 GOPs. During the normal programming the keyframe distance can be around 40 GOPs sometimes reaching values over 100. The average keyframe distance is computed as the running average from the keyframe distances within a window of keyframes. For example, a threshold of 5 keyframes may be used to distinguish commercial or action content from other content.

The various MPEG data, alone and combination, were derived from, and compared with, sample video material from television broadcasts for purposes of commercial detection. Graphs were plotted showing all the combination features against time with actual commercial breaks indicated on the time line for European content. Using this graphical analysis, each feature can be analyzed for its ability to indicate a commercial break, alone and in concert with others of the features. The results of this analysis are summarized in Tables I and II.

TABLE I

Individual feature contribution to detection of commercial location

| Genre | Black frame | Letterbox | Progressive/Interlaced | Keyframe distance |
|---|---|---|---|---|
| Sports | no | no | no | no |
| | yes | no | yes | yes |
| Talk show | yes | yes | yes | yes |
| Movie | no | no | yes | no |
| | yes | no | yes | no |
| Talk show | no | no | yes | no |
| | yes | no | yes | no |
| | yes | no | yes | no |
| | yes | no | yes | yes |
| News | yes | no | yes | no |
| | yes | no | yes | no |
| Talk show | yes | yes | yes | yes |
| | yes | no | yes | yes |
| Talk show | yes | no | yes | yes |
| | yes | no | yes | yes |
| Sports | yes | yes | yes | yes |
| | yes | yes | yes | no |
| | yes | no | yes | yes |
| | yes | yes | yes | yes |
| Sports | yes | no | yes | yes |
| | yes | yes | yes | yes |
| | yes | no | yes | yes |
| | yes | no | yes | yes |
| | yes | yes | yes | yes |
| | yes | no | yes | yes |
| | yes | no | yes | no |
| | yes | no | yes | no |
| | yes | no | yes | no |
| | yes | no | yes | no |

TABLE II

Individual feature contribution to detection of commercial boundary

| Genre | Black frame | Letterbox | Progressive/Interlaced | Keyframe distance |
|---|---|---|---|---|
| Sports | no | no | no | no |
| | no | no | no | no |
| Talk show | yes | no | yes | no |
| Movie | no | no | no | no |
| | yes | no | yes | no |
| Talk show | no | no | yes | no |
| | no | no | yes | no |
| | no | no | yes | no |
| | no | no | yes | no |
| News | no | no | yes | no |
| | no | no | no | no |
| Talk show | no | yes | no | no |
| | no | no | yes | no |
| Talk show | no | no | yes | no |
| | no | no | no | no |
| Sports | no | no | no | no |
| | no | no | no | no |
| | no | no | no | no |
| Sports | no | no | no | yes |
| | no | no | yes | no |
| Sports | no | no | yes | no |
| | no | no | yes | no |
| Drama | no | no | no | no |
| | no | no | no | yes |
| Drama | no | no | yes | no |
| | no | no | no | no |
| | no | no | no | no |
| | no | no | yes | no |

The tables indicate the program genre and columns for black frames, letterbox, progressive-interlaced change and average keyframe distance. In Table I, for each feature, it was determined if that feature alone could be used as an indicator of the location of the commercial. The conclusion is indicated as either yes or no. In Table II, for each feature, it was determined if that feature alone could be used to determine the correct boundaries of the commercial. Table I shows that black frame presence, progressive/interlaced material changes are strong indicators of the location of the commercial break within the program. The keyframe distance is a much weaker indicator compared to the black frame and progressive/interlaced changes. Reliance on progressive/interlaced change detection produces many false-positives, but rarely misses a commercial boundary. This may be true of other features as well. A technique in which one feature is used as a trigger and one or more other features used to verify, so as to delete false-positives, was developed.

Table II shows that individual features cannot be used alone to reliably detect the true boundaries of the commercial breaks. However, the tolerance used for generating the table required that strict boundaries (within 2 seconds) be found. That is, if the commercial boundary were detected a little early or late by an interval of more than 2 seconds, it was regarded as a clean miss. If this criterion were relaxed, some of the features, particularly unicolor frames, could be used alone to reasonably good effect. In Table II, the columns indicate whether the feature can be used by itself to identify correctly both the beginning and the ending of a commercial break. Black frames can be misleading because the broadcasters do not always insert them properly and because the intensity level may vary such that the method will not detect them. This tolerance may be adjusted by providing a threshold that permits greater variability in luminance among adjacent frames in the test for black (monocolor) frames. The letterbox and keyframe distance appear to be unreliable for detection of the boundaries of commercial breaks. Note that black frames can be used to detect commercial boundaries with substantial accuracy overall on average if the criterion for missing is softened. The above table was based on a two-second miss being a complete failure. So a detector based on black frame detection still provides rather accurate commercial detection.

Figure 2:
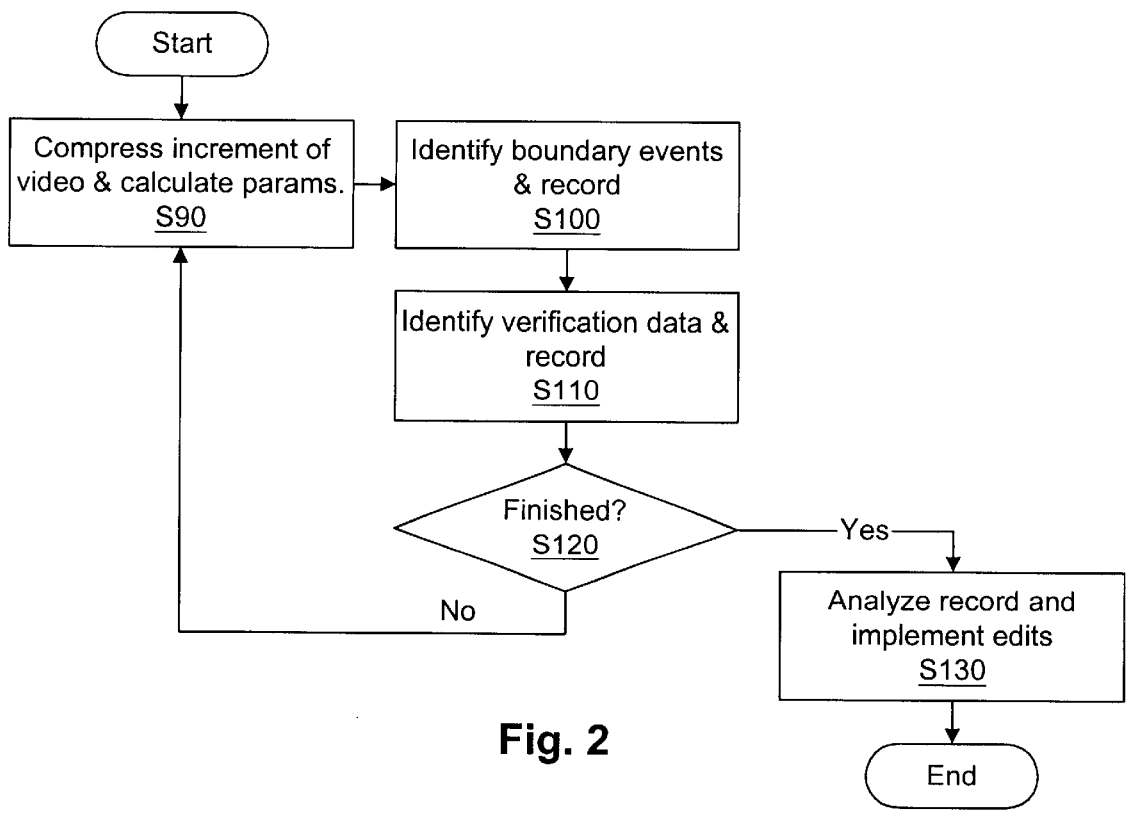
FIG. 2 is a flow chart illustrating a process that makes use of compression features for identification of content sequences according to an embodiment of the invention.

Referring to FIG. 2, the following is a method for content detection, e.g., commercial detection, based on the features:

black frame detection;

unicolor frame detection;

progressive vs. interlaced mode detection;

keyframe distance;

letterbox; and density of MAD values.

As video is compressed, the raw data and the above values are computed for each I frame in step S90. In step S100, boundary sequences are identified and recorded, with a frame identification, if present. In step S110, verification data is identified and, if present, recorded with the appropriate frame identifiers. If the process is incomplete in step S120, the next increment of video is compressed in step S90. When the process is completed, a set of data describing the video sequence in terms of the above features is stored in association with the compressed video and when displayed, appropriate editing may be performed as required in step S130.

Since it may not be known, when a particular video sequence is compressed, precisely what edits will be applied, a full record of the compression features may be recorded as the video is compressed. In that way, the editing may be applied at the time of viewing. Alternatively, if the edits to be applied to the video are known, the stored compressed video may be edited in advance, or a set of instructions for editing may be stored and the record of compression features discarded.

Figure 3:
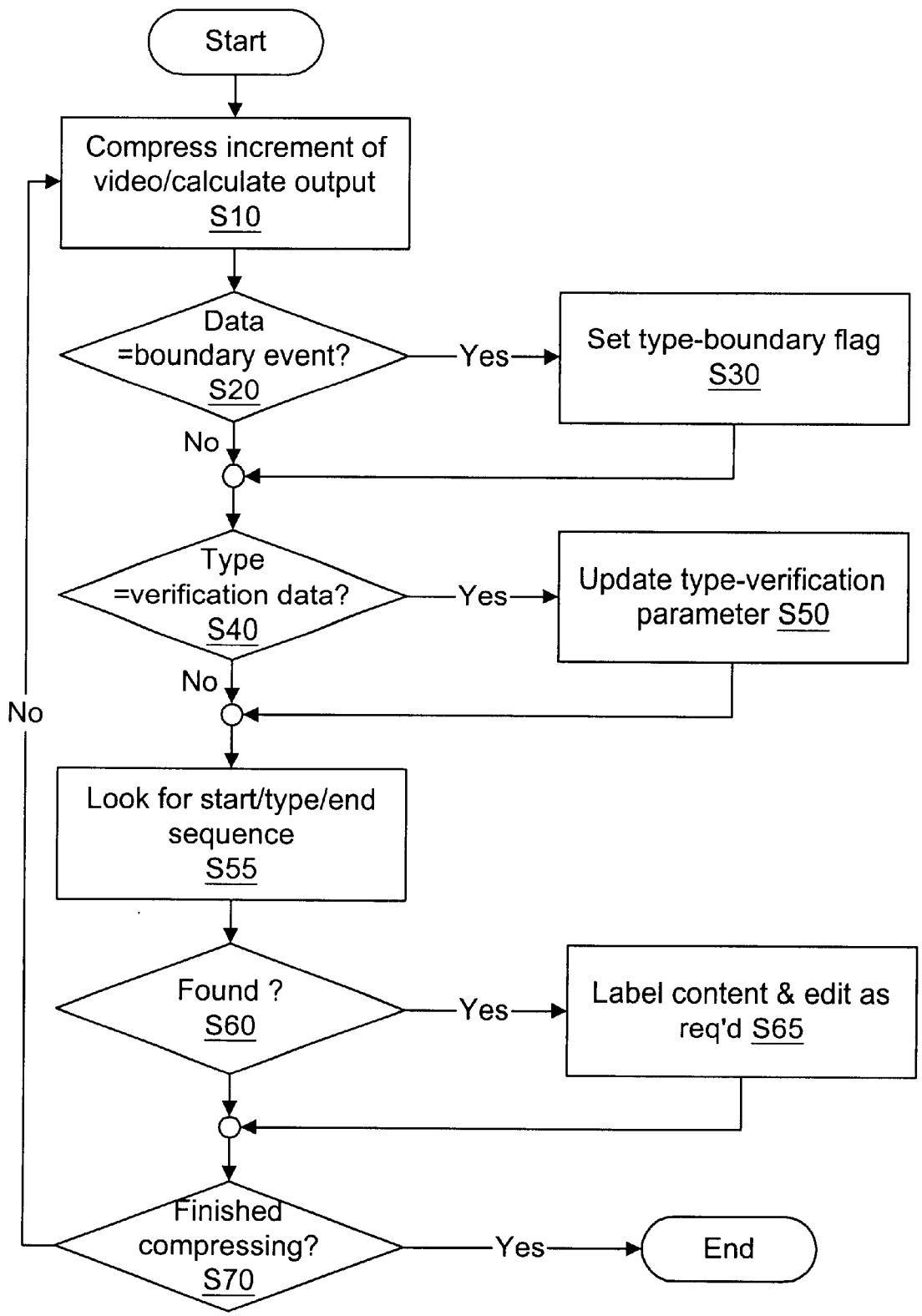
FIG. 3 is a flow chart illustrating a process that makes use of compression features for identification of content sequences according to another embodiment of the invention.

Referring to FIG. 3, it may be desired to allow identification and editing of video material in a process that is closer to a real time process. For example, if a personal digital recorder is buffering broadcast video material by compressing the broadcast and the user is viewing this material with a certain delay, it would be beneficial to be able to identify content sequences as the broadcast is being compressed. This is instead of completing compression and only then identifying the content sequences and applying the appropriate editing; for example turning the volume down during commercials. In an alternative process for identifying particular forms of content, video data is compressed S10. Then, in step S20, the system checks for the presence of a boundary trigger event, for example, a sequence of black or unicolor frames as indicated by differential luminance detection or a change from progressive to interlace. If a trigger event is detected, a flag indicating the detection of a start of a type of content has begun is set in step S30. The record includes an identification of the frame where it was found so that a time sequence of events can be generated. There may be many flags for each of a variety of different types of video sequences (e.g., one for commercials, one for violent content, one for action, one for talking heads, etc.)

If there is no trigger event in step S20, control passes to step S40. In step S40, the presence of a type of data that may be used to verify a commercial or other type of video content sequence is identified, if present. If such data is found, it is stored in step S50. In step S55, it is determined if there are bounded sequences of subject matter that may be verified as being of a particular type. If found, they are recorded in step S65 along with an indication of the frame where it was identified. If editing is applicable at step S65, instructions for editing can be recorded and later (or presently) implemented at this step. If the compression process is completed in step S70, then the process terminates. If not, it resumes at step S10.

The events that indicate the start and/or end of particular types of video, such as commercials, may be any suitable feature. One that has been discovered by experiment to be particular useful for commercial detection is the frame distance between detected unicolor or black frames (or consecutive sequences of black or unicolor frames). These may be used as triggers because in certain cases instead of black frames, broadcasters in certain countries have started using other monochrome frames. If the black frame distance conforms to a certain pattern (distance is between certain threshold 20 to 40 seconds) then the algorithm starts counting the number of black frames. After three black frames the probability of commercial detection increases and potential commercial end is set. Any of the different features could be used as commercial triggers, however a much more complex algorithm may be desirable for verification.

In an experimental evaluation, the black frame sequence appearance was used as a trigger for commercial detection. Normally black frames (or unicolor frames) are used by the content creators to delineate commercials within a commercial break, as well as the beginning and ending of a whole commercial break. It may be assumed that a commercial break starts with a series of black (unicolor) frames and that during the commercial break a black frame will be follow within 1200 frames. Constraints may be placed on the duration of the commercials. For example, to be verified as a commercial, a sequence may be required to be no shorter than 1,500 frames and no longer than 10,000 frames (European content, which is 25 frames per second—US is 30 frames per second). An additional constraint may be applied to the minimum time between a candidate sequence before it will be labeled a commercial. For example, commercials may be required to be at least two minutes apart (3000 frames). The last constraint may be important for the linking of the segments that potentially represent commercials. If the linking is allowed for a long period of time, overly long "commercial" breaks might result which include non-commercial subject matter.

Once a potential commercial is detected, for example by detection of a black frame, other features are tested to increase or decrease the probability that the black frame, or other trigger event, actually indicated the start of a commercial break. For example, the presence of a letterbox change immediately after the black frame, a shift from progressive to interlace video material (or the reverse), a high cut rate, high MAD density, or low keyframe distance may serve as verifiers. In the case of low keyframe distance (or high cut rate), a threshold level may be used such that the probability of a commercial is increased if the threshold is exceeded and reduced if not. Alternatively, the probability may be proportional to the inverse of the keyframe distance and proportional to the MAD density.

It has been determined empirically that the average number of keyframes between scene cuts can be as low as 5 GOPs during commercials. The threshold used for the keyframe distance can be varied in the range of 10 to 15 for good results. Again, segments that are close to each other can be linked to infer the whole commercial break. There are commercials that are characterized by long keyframe distances. To allow for this, a tolerance can be built in to allow the keyframe distance to be higher for some maximum interval, say 750 frames, i.e. half a minute.

The above feature set provided by a compression encoder may also be applied in sophisticated ways to recognize different kinds of content. For example, these features and further features derived therefrom, may also serve as inputs to a neural network, hidden Markov model, Bayesian network, or other classification engine to permit recognition of various types of video content. Thus, for example, rather than separate out one feature as a trigger feature indicating a potential start of a commercial, the entire feature set could be used to train a network to identify commercials, leaving it to the training process to determine the particular import of the various features in determining the start and end events that bound the commercials.

Although the examples discussed above focussed mainly on video features, audio features generated during compression of audio data or the audio portions of video data may be exploited in the same ways as discussed above. For example, the sound volume intensity of a commercial or action sequence of video data may be different from that of other portions. Audio compression encoders produce representations of audio data that will be recognized as providing unique signatures that can be recognized in an automated system to help distinguish certain kinds of content from others. For example the current bit rate or quantizer may indicate the quantity of silent time intervals present. For another example, the DCT coefficients corresponding to high-action, attention-grabbing material, such as commercials, may be very different from those corresponding to the main program material and these signature features may be defined in a classifier, such as a Bayesian classifier, neural network, or hidden Markov model.

Although in the embodiments discussed above, features derived from a compression process are used to classify content in a video stream, it is clear that these same features may be used in conjunction with other features (e.g., real-time features) for the same purposes. For example, real-time audio volume may be used in conjunction with black-frame (or unicolor frame) detection to identify transition to/from commercials. There are many ways of generating additional data from a video source that may be combined with those available from current compression encoders and which may be used in conjunction with the encoder-generated data for video/audio classification. In fact, the compression features may be employed as a secondary feature set to augment a primary feature set used for detailed content analysis, such as text recognition, face recognition, etc.

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A content editor, comprising: a video compression encoder that generates first and second feature data from a video sequence as part of a compression process resulting in a compressed version of video data; said first and second feature data being separate from said compressed version of video data; an analysis engine programmed to receive said first and second feature data and calculate at least a third feature datum from at least one of said first and second feature data; a playback selector programmed to edit said compressed version of video data responsively to said at least a third feature datum, wherein said third data includes an identifier of a transition between letterbox format and non-letterbox format.

2. A content editor, comprising: a video compression encoder that generates first and second feature data from a video sequence as part of a compression process resulting in a compressed version of video data; said first and second feature data being separate from said compressed version of video data; an analysis engine programmed to receive said first and second feature data and calculate at least a third feature datum from at least one of said first and second feature data; a playback selector programmed to edit said compressed version of video data responsively to said at least a third feature datum, wherein said third data includes an identifier of a transition between interlaced and progressive video.

3. A content editor, comprising: a video compression encoder that generates first and second feature data from a video sequence as part of a compression process resulting in a compressed version of video data; said first and second feature data being separate from said compressed version of video data; an analysis engine programmed to receive said first and second feature data and calculate at least a third feature datum from at least one of said first and second feature data; a playback selector programmed to edit said compressed version of video data responsively to said at least a third feature datum, wherein said third data includes an identifier of an average of multiple substantially different frequencies of scene cuts.

4. A video content detector, comprising: a video compression encoder capable of receiving uncompressed video data and generating compressed video data; said analysis engine being connected to receive first data from the video compression encoder, said first data being separate from said compressed video data; said first data being generated as a result of a compression process; said analysis engine being programmed to generate an identifier of a beginning of a type of content in said compressed video responsively to said first data, wherein said analysis engine is programmed to identify, responsively to said first data, the presence or absence of a letterbox in said uncompressed video data and to generate an identifier of a location in a sequence of said compressed video data coinciding with said presence or absence.

5. A video content detector, comprising: video compression encoder capable of receiving uncompressed video data and generating compressed video data; said analysis engine being connected to receive first data from the video compression encoder, said first data being separate from said compressed video data; said first data being generated as a result of a compression process; said analysis engine being programmed to generate an identifier of a beginning of a type of content in said compressed video responsively to said first data, wherein said analysis engine is programmed to identify, responsively to said first data, the presence of interlaced or progressive video format in said uncompressed video data and to generate an identifier of a location in a sequence of said compressed video data coinciding with said interlaced or progressive video format.

6. A video content detector, comprising: a video compression encoder capable of receiving uncompressed video data and generating compressed video data; said analysis engine being connected to receive first data from the video compression encoder, said first data being separate from said compressed video data; said first data being generated as a result of a compression process; said analysis engine being programmed to generate an identifier of a beginning of a type of content in said compressed video responsively to said first data, wherein said analysis engine is programmed to identify, responsively to said first data, an indicator of an average of multiple substantially different frequencies of scene cuts.

7. A content editor, comprising: a video processor configured to generate feature data from a video sequence; said feature data including an identifier of a transition between letterbox format and non-letterbox format; a playback selector programmed to receive said identifier and edit said compressed version of video data responsively to said identifier.

8. A content editor, comprising: a video processor configured to generate first and second feature data from a video sequence; said first and second feature data being separate from said compressed version of video data; an analysis engine programmed to receive said first and second feature data and calculate at least a third feature datum from at least one of said first and second feature data; a playback selector programmed to edit said compressed version of video data responsively to said at least a third feature datum, wherein said third data includes an identifier of a transition between interlaced and progressive video.

9. A video content detector, comprising: a video analysis engine programmed to generate an identifier of a change in a type of content in a video data stream at least in part by calculating an average frequency of scene cuts in a segment of said video data stream and generating an identifier of a location of said segment responsively to said average frequency; an editing process controller configured to receive said identifier and control and editing process thereof responsively to said identifier, wherein said average is taken over substantially different frequencies of scene cuts.

10. A content editor, comprising: a video processor configured to generate first and second feature data from a video sequence; said first and second feature data being separate from said video sequence; an analysis engine programmed to receive said first and second feature data and calculate at least a third feature datum from at least one of said first and second feature data; a playback selector programmed to edit said video data responsively to said at least a third feature datum, wherein said third feature datum includes an identifier of a transition between letterbox format and non-letterbox format.

11. A content editor, comprising: a video processor configured to recognize a letterbox format in a video stream and output an indication of a presence or absence of a letterbox in respective portions of said video stream, an analysis engine programmed to receive said indication of a presence and to output, in response thereto, an indication of a content of said video stream; a playback selector programmed to edit said video data responsively to said indication of a content.

12. A content editor as in claim 11, wherein said indication of a content indicates a transition between letterbox format and non-letterbox format.

13. A content editor, comprising: a video processor that generates feature data from a video sequence; said feature data being separate from said video data; an analysis engine programmed to receive said feature data and identify a transition between interlaced and progressive video and output an identification thereof; a playback selector programmed to edit said video data responsively to said identification.

14. A content editor, comprising: a video processor tat generates feature data from a video sequence; said feature data being separate from said video data; an analysis engine programmed to receive said feature data and calculate an avenge frequency of scene cuts in respective portions of said video data and to output an indication of program content responsively to said average frequency of scene cuts; an editing process controller configured to edit said video data responsively to said indication, wherein said average is taken over substantially different frequencies of scene cuts.

15. A content editor as in claim 14, wherein said editing process controller includes a playback selector.

16. A video content detector, comprising: a video analysis engine programmed to generate an identifier of a change in a type of content in a video data stream at least in part by detecting a change in a video format and generating an identifier of a location in said video data stream of said change; an editing process controller configured to receive said identifier and control and editing process thereof responsively to said identifier.

17. A content editor as in claim 1, wherein said editing process controller includes a playback selector.

18. A video content detector, comprising: a video analysis engine programmed to generate an identifier of a change in a type of content in a video data stream at least in part by detecting a change of letterbox size and generating an identifier of a location in said video data stream of said change; an editing process controller configured to receive said identifier and control and editing process thereof responsively to said identifier.

19. A content editor as in claim 18, wherein said editing process controller includes a playback selector.

* * * * *